(12) United States Patent
Popelka et al.

(10) Patent No.: US 12,028,303 B2
(45) Date of Patent: *Jul. 2, 2024

(54) TECHNIQUES FOR CONFIGURING COMMUNICATION PROCESS FLOW ACTIONS

(71) Applicant: Salesforce, Inc., San Francisco, CA (US)

(72) Inventors: Aaron Popelka, San Francisco, CA (US); William Robert Jennings, II, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,104

(22) Filed: May 10, 2023

(65) Prior Publication Data

US 2023/0275860 A1   Aug. 31, 2023

Related U.S. Application Data

(63) Continuation of application No. 17/649,028, filed on Jan. 26, 2022, now Pat. No. 11,689,485.

(51) Int. Cl.
| | |
|---|---|
| *H04L 51/10* | (2022.01) |
| *G06F 16/27* | (2019.01) |
| *H04L 51/066* | (2022.01) |
| *H04L 51/52* | (2022.01) |
| *H04L 51/56* | (2022.01) |
| *H04L 67/02* | (2022.01) |

(Continued)

(52) U.S. Cl.
CPC .............. *H04L 51/10* (2013.01); *G06F 16/27* (2019.01); *H04L 51/066* (2013.01); *H04L 51/52* (2022.05); *H04L 51/56* (2022.05); *H04L 67/02* (2013.01); *H04L 69/24* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 9,800,525 B1 * | 10/2017 | Lerner | H04L 51/56 |
| 9,972,015 B2 * | 5/2018 | Moore | H04L 51/52 |
| 10,764,233 B1 * | 9/2020 | Goldberg | H04L 51/56 |

(Continued)

*Primary Examiner* — Lashonda Jacobs-Burton
(74) *Attorney, Agent, or Firm* — Holland & Hart, LLP

(57) ABSTRACT

A method for data processing that includes receiving an indication of a configuration for a first action of a communication process flow that controls electronic communications between a tenant of a multi-tenant system and a first set of users associated with the tenant. The method further includes associating, within a storage location associated with the tenant, a unique identifier with metadata that defines the configuration. The method further includes receiving a request to apply the configuration to a second action of a communication process flow that controls electronic communications between the tenant and a second set of users associated with the tenant. The request may indicate the unique identifier associated with the metadata. The method further includes retrieving the metadata from the storage location using the unique identifier indicated by the request. The method further includes applying the configuration to the second action using the retrieved metadata.

20 Claims, 12 Drawing Sheets

(51) Int. Cl.
*H04L 69/24* (2022.01)
*H04L 9/40* (2022.01)

(56) References Cited

U.S. PATENT DOCUMENTS

| | | | |
|---|---|---|---|
| 11,277,359 B2* | 3/2022 | Mia | G06F 21/31 |
| 11,303,521 B1* | 4/2022 | Naik | H04L 41/069 |
| 11,316,818 B1* | 4/2022 | Nagar | H04L 51/063 |
| 2014/0068732 A1* | 3/2014 | Hinton | G06F 21/41 |
| | | | 726/6 |
| 2015/0081569 A1* | 3/2015 | Moore | H04W 4/21 |
| | | | 709/204 |
| 2018/0115877 A1* | 4/2018 | Riker | H04L 51/066 |
| 2018/0225317 A1* | 8/2018 | Lalani | G06F 16/9017 |
| 2018/0300305 A1* | 10/2018 | Lam | G06Q 10/101 |
| 2019/0140995 A1* | 5/2019 | Roller | H04L 51/18 |
| 2020/0074474 A1* | 3/2020 | Chauhan | G06Q 50/01 |
| 2021/0067486 A1* | 3/2021 | Souhrada | H04L 12/4641 |
| 2022/0070133 A1* | 3/2022 | Santo | H04L 51/043 |
| 2022/0114238 A1* | 4/2022 | Padmanabhan | G06F 21/121 |
| 2022/0343250 A1* | 10/2022 | Tremblay | G06Q 10/0633 |
| 2022/0345427 A1* | 10/2022 | Longo, Jr. | H04L 67/306 |
| 2023/0029697 A1* | 2/2023 | Kruk | G06N 20/00 |

* cited by examiner

FIG. 3 welcome
A channel to develop our Welcome Campaign

Marketing Cloud Journeys [APP] 10:37 AM
Added: Email Activity by *a_popelka* in Cyber Week 2021 in Business Unit 1
— 410      — 415      — 420

Marketing Cloud Journeys [APP] 10:44 AM
Updated: Email Activity by *a_popelka* in Cyber Week 2021 in Business Unit 1
Message Name: Aaron's Email
Campaign Association: 2021 Summer Promotions
Message Last Modified: 1/19/2022, 5:31 PM MST
Activity ID: 20Hr8342kLd  — 435
Message Subject Line:
Hey %%First_Name%%, here is your %%Promo_Discount%% off coupon for signing up!
[Details] — 440

Marketing Cloud Journeys [APP] 10:55 AM
Updated: Email Activity by *a_popelka* in Cyber Week 2021 in Business Unit 1

Settings
Revert to Version  — 425
Copy Activity ID  — 430

Sidebar:
- Acme Inc.
- All Unread
- Threads
- DMs
- @ Mentions
- Saved Items
- ▼ Channels 450
  - # planning
  - # marketing
  - # welcome
- ⊕ Add Channels
- ▼ Apps
  - Marketing Cloud Journeys
- ⊕ Add Apps Message #welcome
B *I* U
— 445

FIG. 4

TECHNIQUES FOR CONFIGURING COMMUNICATION PROCESS FLOW ACTIONS

CROSS REFERENCES

The present Application for Patent claims priority to U.S. Pat. No. 11,689,485 by Popelka et al., entitled "TECHNIQUES FOR CONFIGURING COMMUNICATION PROCESS FLOW ACTIONS," filed Jan. 26, 2022, which is assigned to the assignee hereof and expressly incorporated by reference herein.

FIELD OF TECHNOLOGY

The present disclosure relates generally to database systems and data processing, and more specifically to techniques for configuring communication process flow actions.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement a communication process flow that controls communications between a tenant and a set of users (e.g., subscribers), and a communication platform (e.g., separate from the cloud platform) may be used for internal communications related to cloud platform functionality. However, because the communication platform and the cloud platform may be implemented in (e.g., supported by) separate computing systems, some features of the communication process flow management system may be incompatible with the communication platform, which may result in workflow inefficiencies and decreased user satisfaction.

BRIEF DESCRIPTION OF THE DRAWINGS

FIGS. 3 and 4 illustrate examples of user interfaces that support techniques for configuring communication process flow actions in accordance with aspects of the present disclosure.

DETAILED DESCRIPTION

Figure 1:
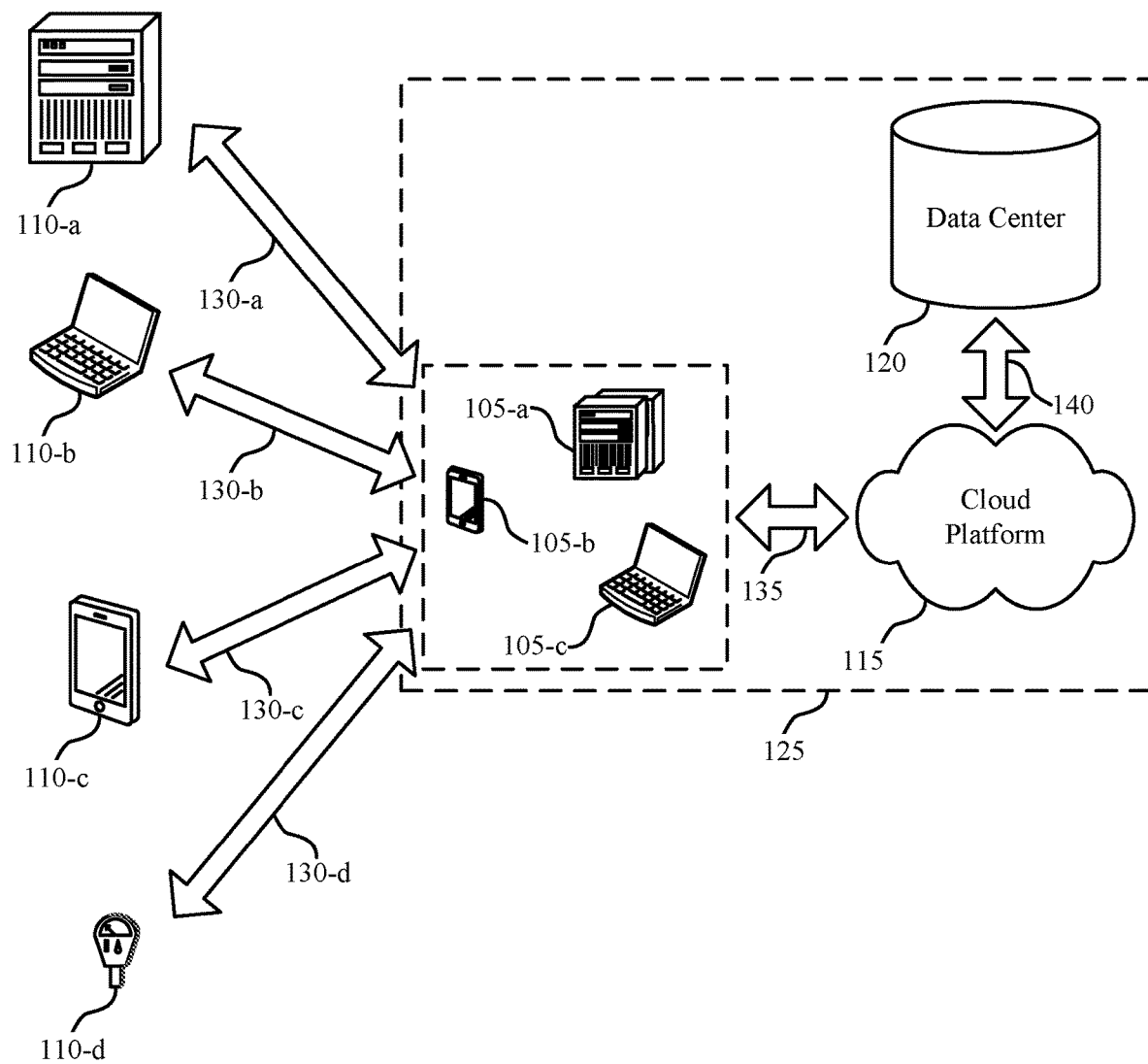
FIGS. 1 and 2 illustrate examples of data processing systems that support techniques for configuring communication process flow actions in accordance with aspects of the present disclosure.

Techniques described herein may enable users to configure and update communication process flow actions (equivalently referred to herein as actions or activities) with greater efficiency and fewer manual interactions. A communication process flow management service may support creation, configuration, management, and deployment of a communication process flow that manages communications between a set of users and a tenant or organization. For example, an organization or tenant may use the communication process flow management service to schedule and manage communications between the organization and a set of users, which may be examples of subscribers, customers, or prospective customers of the organization. Users may receive electronic communications (e.g., emails, messages, advertisements) according to a communication process flow. The communication process flow may include various actions and message configurations, and transmission of various communications may be dependent on user attributes and user web behavior, among other parameters.

In some cases, administrative users or employees associated with the tenant (e.g., a marketing team) may communicate, plan, and monitor aspects of a communication process flow using a communication platform. For example, the communication platform may support communication channels that are organized by topic, and team members may use these communication channels (e.g., chat rooms) to make decisions regarding a communication process flow. However, because the communication platform may be separate from the communication process flow management service, data associated with the communication process flow may be confined to computing systems that support the communication process flow management service. In some cases, users may use this data to determine whether to stop, pause, or modify aspects of a communication process flow. However, because these actions may be confined to the communication process flow management service, users may be unable to perform such actions from within the communication platform.

Aspects of the present disclosure may improve the efficiency of developing and updating communication process flows by enabling users to copy communication process flow actions (e.g., activities) and relevant metadata from one communication process flow to another. For example, if a user applies a first configuration to a first communication process flow action, a unique identifier may be assigned to the first configuration. Specifically, a communication process flow management service may associate a unique identifier with metadata that defines the first configuration. Accordingly, the communication process flow management service may store the unique identifier and the metadata in a storage location (e.g., data store, data center) such that the metadata can be retrieved at a later time. If, for example, another user transmits a request indicating the unique identifier, the communication process flow management service may use the unique identifier to retrieve the metadata from the storage location. Once retrieved, the communication process flow management service can use the metadata to apply the first configuration to other communication process flow actions. As such, the described techniques may improve the efficiency of applying the same configuration to multiple communication process flow actions.

Aspects of the present disclosure may also enable users to revert a communication process flow action to a previous configuration (e.g., state, version). For example, if a user applies a first configuration to a communication process flow action at a first time and subsequently applies a second configuration (e.g., a different configuration) to the communication process flow action at a second time (e.g., a subsequent time), the communication process flow management service may associate the first configuration with a first unique identifier, and may associate the second configuration with a second unique identifier that is different from the first unique identifier. If, for example, the user wants to revert the communication process flow action back to the first configuration, the user may input the first unique identifier (e.g., instead of manually changing the configuration settings of the communication process flow action). Thus, the techniques described herein may enable users to duplicate, revert, and update communication process flow actions with reduced latency and less manual interaction, among other benefits.

In some examples, users may duplicate or revert action configurations from within a communication channel of a communication platform. For example, a user of the communication platform may enter (e.g., into a chat window or user interface associated with the communication platform) a unique identifier associated with a configuration of a communication process flow action or select a user interface component associated with an entry into the channel. The entry may include information about a prior configuration of an action where the prior configuration is associated with the unique identifier. Accordingly, the communication platform may transmit an indication of the unique identifier to the communication process flow management service. Upon receiving this indication, the communication process flow management service may retrieve metadata associated with the configuration (e.g., using the unique identifier), and may apply the configuration to the communication process flow action (e.g., using the associated metadata). As a result, the techniques described herein may enable users to interact with (e.g., update, revert) communication process flows via the communication platform.

Aspects of the disclosure are initially described in the context of an environment supporting an on-demand database service. Aspects of the disclosure are illustrated by and described with reference to data processing systems, user interfaces, and process flows. Aspects of the disclosure are further illustrated by and described with reference to apparatus diagrams, system diagrams, and flowcharts that relate to techniques for configuring communication process flow actions.

FIG. 1 illustrates an example of a data processing system 100 for cloud computing that supports techniques for configuring communication process flow actions in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some data processing systems may support communication process flows that control electronic communications between a tenant of a multi-tenant system and a set of users associated with the tenant. These communication process flows may include dozens or hundreds of actions (e.g., activities) that define various interactions between the tenant and the set of users. Each action may have a specific configuration that is defined by metadata (e.g., fields, parameters, variables, settings, user information). In some cases, an action may be used across multiple communication process flows. However, duplicating the configuration of an action from one communication process flow to the next may involve a large number of manual interactions. Moreover, users may be unable to revert a communication process flow to a previous state without performing a large number of undo operations.

In accordance with aspects of the present disclosure, a communication process flow management service may assign a unique identifier to each action configuration, which may enable users to share action configurations across multiple communication process flow actions without manually configuring each communication process flow action. Specifically, the communication process flow management service may associate an action configuration with a unique identifier (e.g., an activity identifier or action identifier), and may store both the unique identifier and the related metadata (e.g., metadata defining the action configuration) in a storage location. Accordingly, users of the communication process flow management service may use the unique identifier to access the corresponding configuration.

As an example, if a user enters the unique identifier into a user interface associated with the communication process flow management service or otherwise selects a component associated with the unique identifier, the communication process flow management service may use the unique identifier to retrieve the associated metadata from the storage location. Once the communication process flow management service has retrieved the associated metadata, the communication process flow management service can apply the corresponding configuration to other communication process flow actions. Moreover, users may share or exchange these unique identifiers within communication channels of a communication platform, which may enable action configurations to be shared between users, teams, or business units of a tenant.

Assigning unique identifiers to action configurations may enable the communication process flow management service to provide users with a comprehensive audit log for a communication process flow, and may also enable users to quickly revert a communication process flow to a previous state. Moreover, the techniques described herein may enable the communication process flow management service to generate a list of recommended actions for a communication process flow. For example, the communication process flow management service may suggest one or more actions based on an audit log associated with a communication process flow or based on similarities between the communication process flow and other related communication process flows. If a user selects one or more of the suggested actions, the communication process flow management service may use unique identifiers associated with the selected actions to retrieve relevant metadata and configure the selected actions within the communication process flow.

In some examples, the communication process flow management service may verify that a request is from an authenticated (e.g., authorized) user prior to reverting or reconfiguring communication process flow actions. In other words, if the communication process flow management service receives a request to revert or update a communication process flow action, the communication process flow management service may determine whether to accept or reject the request based on a permission of a user associated with the request. If the communication process flow management service determines that the request is from an authenticated user (e.g., a user with approval status), the communication process flow management service may implement the requested updates. Otherwise, the communication process flow management service may reject the request. Verifying user permissions prior to implementing changes may reduce the likelihood of unintentional or undesired reversions.

It should be appreciated by a person skilled in the art that one or more aspects of the disclosure may be implemented in a data processing system to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
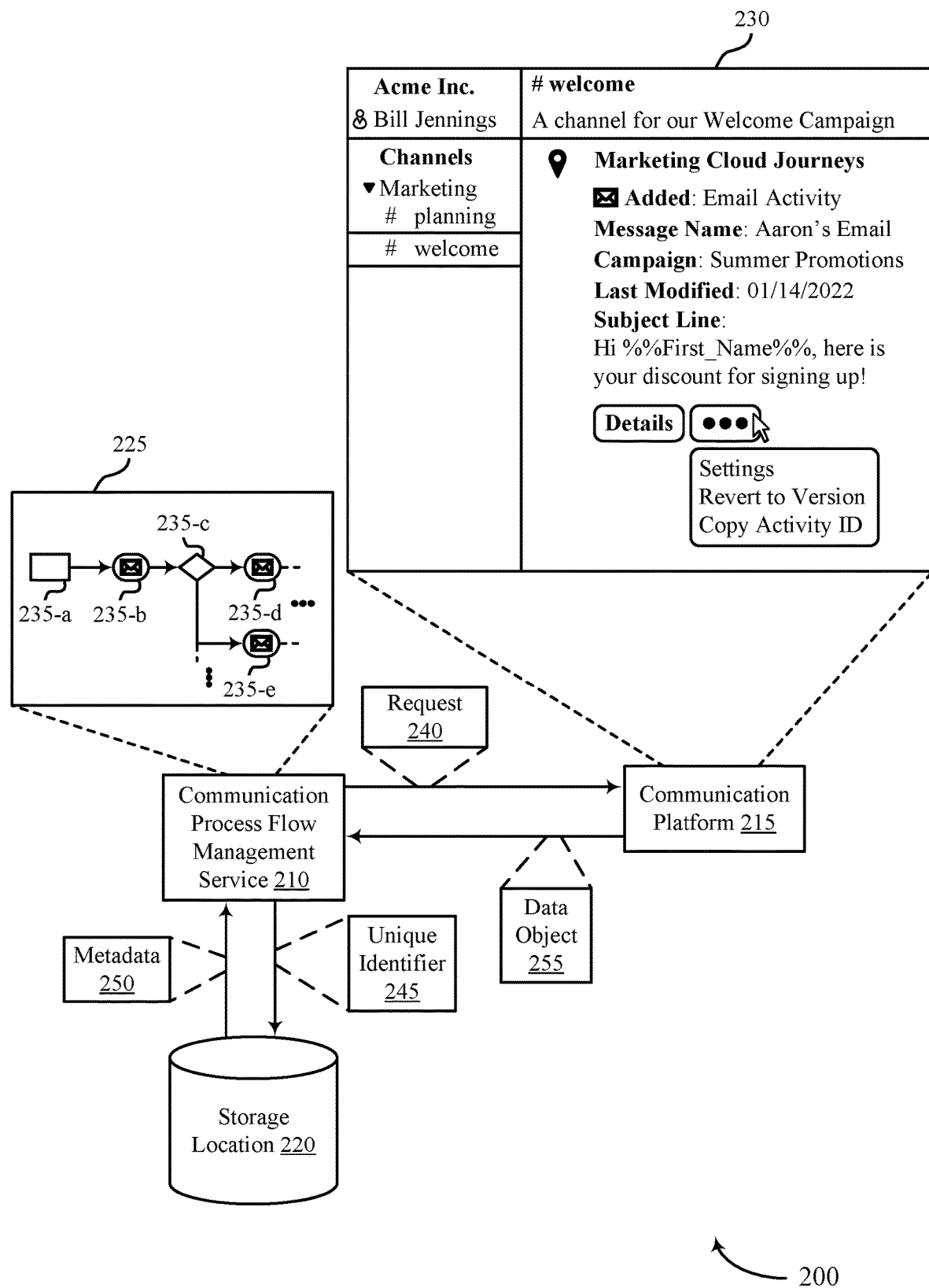

FIG. 2 illustrates an example of a data processing system 200 that supports techniques for configuring communication process flow actions in accordance with aspects of the present disclosure. The data processing system 200 may implement or be implemented by aspects of the data processing system 100. For example, the data processing system 200 may include a communication process flow management service 210, a communication platform 215, and a storage location 220, each of which may be implemented by aspects of a cloud platform 115 or a subsystem 125 described with reference to FIG. 1. In some examples, the systems or servers supporting the communication platform 215 may be include computing systems that are logically or physically separated from systems or servers supporting one or both of the communication process flow management service 210 or the storage location 220.

As described herein, the communication process flow management service 210 may support creation, configuration, and implementation of various communication process flows (e.g., a communication process flow 225) that control electronic communications between a tenant and a set of users associated with the tenant. For example, users associated with the tenant may use the communication process flow management service 210 to perform actions (e.g., actions 235) that include processor-executable instructions for management of electronic communications. For example, an action 235-*a* may include instructions that, when executed by a processor, selects users (e.g., customers) for the communication process flow 225. That is, the action 235-*a* may define a rule for determining whether users are to receive electronic communications in accordance with the communication process flow 225. The rule may be based on various attributes and behaviors (e.g., demographic information, web activity patterns, purchase history) of the users. For example, users that have purchased a product from the tenant (or an organization associated with the tenant) in the last six months may receive electronic communications from the tenant in accordance with the communication process flow 225. Users that do not satisfy this criteria may not receive electronic communications in accordance with the communication process flow 225.

Other actions 235 may define message transmission schemes, decision splits, and other related processes. For example, each user that satisfies a rule defined by the action 235-*a* may receive an email according to an action 235-*b*. The action 235-*b* may include specific content that is to be transmitted to the users (e.g., via email). Similarly, an action 235-*c* may define a decision split between users. For example, users that have opened an email corresponding to the action 235-*b* may be routed to an action 235-*d*, while users that have not opened the email corresponding to the action 235-*b* may be routed to an action 235-*e*. Additionally or alternatively, the action 235-*c* (e.g., a decision split) may utilize other attributes and behaviors to route users through the communication process flow 225.

The communication platform 215 may support a chat or instant messaging service used for various business functionalities. For example, teams associated with a tenant may use the communication platform 215 to manage communication process flows supported by the communication process flow management service 210. These teams may use the communication platform 215 to discuss aspects of the communication process flow 225 or to make decisions regarding the communication process flow 225. For example, users of the communication platform 215 may decide to reconfigure or interact with the communication process flow 225 based on data from the communication process flow management service 210. However, because the communication process flow management service 210 and the communication platform 215 may be implemented in separate computing systems, some features of the communication process flow management service 210 may not be supported by the communication platform 215. Thus, if a decision regarding the communication process flow 225 is made by a user within the communication platform 215, the user may be unable to change or interact with the communication process flow 225 from the communication platform 215.

The communication platform 215 may be capable of performing bidirectional communications with the communication process flow management service 210. More specifically, a user may enter a command or activate a user interface component 230 within the communication platform 215, and may interact with the user interface component 230 to modify aspects of the communication process flow 225. The user interface component 230 may enable a user to interact with the communication process flow 225 directly from the communication platform 215. For example, a user may revert or duplicate a configuration of the action 235-*a* from within the communication platform 215 by entering a unique identifier of the configuration (e.g., in a chat window or the user interface component 230). Additionally or alternatively, a user may revert the communication process flow 225 to a previous state or configuration by interacting with the user interface component 230. Likewise, the communication process flow management service 210 may be configured to post a data object 255 (or other information) related to the communication process flow 225 within a communication channel of the communication platform 215.

In the example of FIG. 2, the communication process flow management service 210 may receive a configuration for one or more actions 235 (e.g., activities) of the communication process flow 225. The communication process flow management service 210 may associate a unique identifier 245 with metadata 250 that defines the configuration. The communication process flow management service 210 may store both the unique identifier 245 and the metadata 250 in the storage location 220. In some examples, the communication process flow management service 210 may receive a request 240 to apply the configuration to one or more actions 235 of a second communication process flow, which may be the same or different from the communication process flow 225. The request 240 may indicate the unique identifier 245 of the configuration.

Accordingly, the communication process flow management service 210 may use the unique identifier 245 to retrieve the metadata 250 from the storage location 220 (e.g., by querying the storage location 220). After retrieving the metadata 250, the communication process flow management service 210 may apply the configuration to the one or more actions of the second communication process flow. In some examples, the communication process flow management service 210 may verify a permission (also referred to herein as an authentication level, an approval status, or an authorization level) of a user associated with the request 240 before applying the configuration to the one or more actions of the second communication process flow. In some examples, the communication process flow management service 210 may trigger display of a data object 255 within a communication channel of the communication platform 215 after applying the configuration to the one or more actions of the second communication process flow.

The data processing system 200 may support techniques for improved communication process flow management. For example, the techniques and operations described with reference to FIG. 2 may enable a user of the communication process flow management service 210 to efficiently update, revert, or duplicate the configuration of a communication process flow action (e.g., the action 235-*b*) by associating the configuration with a unique identifier that can be used to retrieve the configuration and all related metadata from the storage location 220. Assigning different unique identifiers to different configurations may enable users to apply the same configuration to multiple actions 235 without manually configuring each of the actions 235. Moreover, the techniques described herein may provide improved cross-platform compatibility between the communication process flow management service 210 and the communication platform 215 by enabling users to update the communication process flow 225 from within the communication platform 215.

Figure 3:
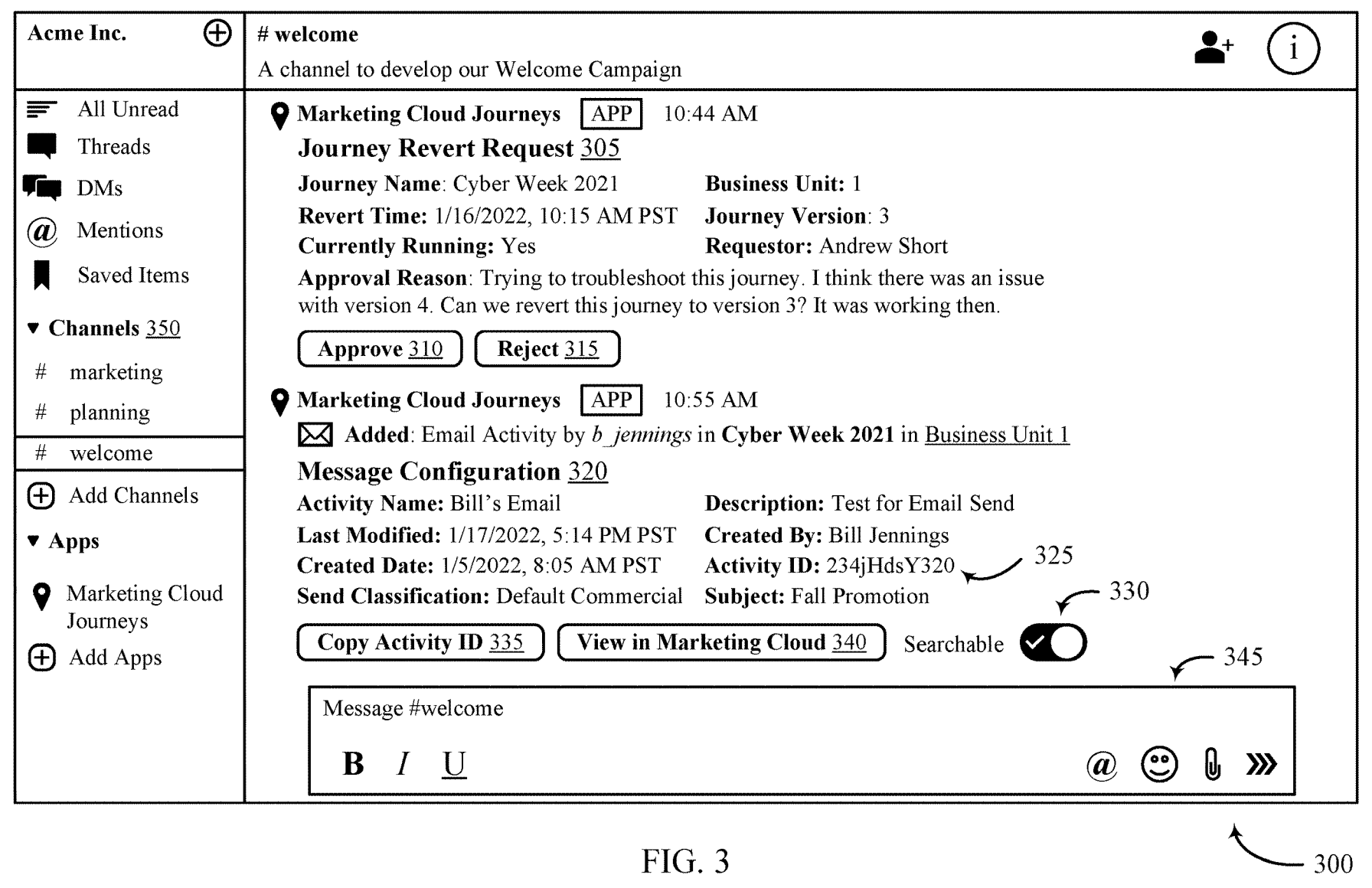

FIG. 3 illustrates an example of a user interface 300 that supports techniques for configuring communication process flow actions in accordance with aspects of the present disclosure. The user interface 300 may implement or be implemented by aspects of the data processing system 100 or the data processing system 200. For example, the user interface 300 may be implemented by a communication platform, which may be an example of a communication platform 215 described with reference to FIG. 2. The user interface 300 may enable users of the communication platform to interact with communication process flows that are stored at or otherwise controlled by a communication process flow management service (e.g., the communication process flow management service 210 described with reference to FIG. 2). Likewise, the user interface 300 may enable the communication process flow management service to post or otherwise display information related to a communication process flow within communication channels 350 of the communication platform.

The user interface 300 may support techniques for duplicating or reusing communication process flow action configurations using activity identifiers (equivalently referred to herein as unique identifiers). These activity identifiers may include all metadata related to a communication process flow action configuration. The user interface 300 may also support sharing these activity identifiers via a communication platform (e.g., the communication platform 215) or via a communication process flow management service (e.g., the communication process flow management service 210). By associating activity identifiers with communication process flow action configurations, the techniques described herein may also enable a communication process flow management service to generate and share recommended actions (or groups of actions) for inclusion in a communication process flow (e.g., the communication process flow 225). These recommended actions may be based on past usage behaviors (e.g., an audit log) associated with the communication process flow, and may be shared across communication process flows.

The user interface 300 may also enable users to revert a communication process flow (or various actions of a communication process flow) to a previous configuration (e.g., state) by entering a unique identifier associated with the previous configuration. Moreover, the user interface 300 may also be configured with an approval layer that processes reversion requests. For example, if a user attempts to revert a communication process flow to a prior configuration by interacting with the user interface 300, an approval layer may verify a permission of the user before reverting the communication process flow to the prior configuration. The techniques described herein may also enable a user to revert a communication process flow to a previous state (e.g., snapshot) without performing hundreds of undo operations on the communication process flow.

The user interface 300 may include a chat window 345, which may enable users of a communication platform to exchange messages within a communication channel of the communication platform. In some examples, a communication channel may be related to a communication process flow. For example, the communication channel illustrated in the example of FIG. 3 (e.g., #welcome) may be related to a communication process flow called Cyber Week 2021. The communication channel illustrated in FIG. 3 may include an audit log (e.g., a series of entries or postings into the channel) that indicates all previous changes made to the communication process flow and any pending changes to the communication process flow. The audit log may be generated using information from a communication process flow management service.

In some examples, an entry into the audit log may include a request 305 to revert a communication process flow to a previous state. The request 305 may indicate a name of the communication process flow, a timestamp associated with the request 305, an indication of whether the communication process flow is active, a business unit or team associated with the communication process flow, a version of the communication process flow, or a user associated with the request 305. The request 305 may, in some examples, include an option 310 to approve the request 305 and an option 315 to reject the request 305. In other examples (e.g., if the user is not authorized to approve changes to the communication process flow), the option 310 and the option 315 may not be presented in the user interface 300.

The audit log may also include an indication of a configuration 320 for a communication process flow action (e.g., "Email Activity"). The configuration 320 may include metadata related to the communication process flow action. For example, the audit log may include a name of the communication process flow action, a last modified date associated with the communication process flow action, a creation date associated with the communication process flow action, a classification of the communication process flow action, a description of the communication process flow action, an author of the communication process flow action, an activity identifier 325 associated with the configuration 320 of the communication process flow action, a subject of the communication process flow action, or a combination thereof. In some examples, the indication may include an option 335 to copy the activity identifier 325 of the configuration 320, an option 340 to view the configuration 320 within a web page or user interface associated with a communication process flow management service, and an option 330 to toggle whether queries are supported for the configuration 320 (e.g., whether the configuration 320 can be shared across different communication process flows). In some examples, the option 330 may be included in a user interface or webpage associated with or supported by the communication process flow management service, rather than or in addition to, the option 330 being included in the indication of the communication platform.

The user interface 300 may support techniques for improved communication process flow management. For example, the techniques and operations described with reference to FIG. 3 may enable a user of a communication process flow management service to efficiently update, revert, or duplicate the configuration of a communication process flow action by associating the configuration with a unique identifier (e.g., the activity identifier 325), which can be used to retrieve the configuration and all related metadata from a storage location. Assigning unique identifiers to action configurations may enable users to apply the same configuration to multiple actions without manually configuring each action. Moreover, the techniques described herein may provide improved cross-platform compatibility between the communication process flow management service and a communication platform by enabling users of the communication platform to update communication process flows from within the communication platform (e.g., via the user interface 300).

FIG. 4 illustrates an example of a user interface 400 that supports techniques for configuring communication process flow actions in accordance with aspects of the present disclosure. The user interface 400 may implement or be implemented by aspects of the data processing system 100, the data processing system 200, or the user interface 300. For example, the user interface 400 may be implemented by a communication platform, which may be an example of a communication platform 215 described with reference to FIG. 2. The user interface 400 may enable users of the communication platform to interact with communication process flows that are stored at or otherwise controlled by a communication process flow management service (e.g., the communication process flow management service 210 described with reference to FIG. 2). Likewise, the user interface 400 may enable the communication process flow management service to post or otherwise display information related to a communication process flow within communication channels 450 of the communication platform.

The user interface 400 may enable a user of a communication platform to discuss, develop, and manage communication process flows that control electronic communications between a tenant of a multi-tenant system and a set of users (e.g., clients, customers) associated with the tenant. The communication platform may include various communication channels 450, each of which may be specific to a project, a team, a business unit, or a communication process flow, among other examples. For example, the communication platform may include a communication channel related to planning, a communication channel associated with a marketing team, and a communication channel for a welcome campaign. The communication platform may support various modes of communication (e.g., threads, direct messages (DMs), mentions, reactions) between users, and may support integration of other applications (e.g., Marketing Cloud Journeys application) within the communication platform.

As illustrated in the example of FIG. 4, a communication channel of the communication platform (e.g., #welcome) may include an audit log of previous updates or changes made to a communication process flow. The audit log may be generated by an application associated with a communication process flow management service (e.g., Marketing Cloud Journeys). If, for example, an action (e.g., email activity) is updated or added to a communication process flow, an indication of this interaction may be displayed within the audit log (e.g., a series of entries into the channel). This indication may include a user identifier 410 (e.g., a_popelka), a communication process flow identifier 415 (e.g., Cyber Week 2021), a sub-tenant identifier 420 (e.g., Business Unit 1), and a timestamp (e.g., 10:37 AM) associated with the interaction.

Some indications in the audit log may include supplemental information associated with an interaction. For example, an indication may include an activity identifier 435 (e.g., 20Hr8342kLd) associated with a specific action configuration, an option 440 to view additional details related to the change, an option 425 to revert an action to a previous configuration, or an option 430 to copy the activity identifier 435. After interacting with (e.g., selecting) the option 430, a user may post the activity identifier 435 into a chat window 445 of the communication platform, which may enable the activity identifier 435 (and corresponding action configuration) to be shared with other users of the communication platform. Interacting with the option 425 may trigger a request to revert a communication process flow to a previous state or configuration.

In some examples, the audit log may also include a list of recommended actions (e.g., activities) for a communication process flow. A communication process flow management service may identify these recommended actions from actions that were previously added to the communication process flow or from actions that are present in similar communication process flows. The list may include a unique identifier for each recommended action, which can be used to retrieve metadata associated with the recommended action. If, for example, a user selects a recommended action from the list, a request may be sent from the communication platform to the communication process flow management service. The request may include the unique identifier associated with the selected action, an identifier of the communication process flow to which the selected action is to be added, an identifier of the user that selected the action, or a combination thereof. Using this information, the communication process flow management service may add the selected action to the communication process flow.

In some examples, the user interface 400 may correspond to a specific permission or authentication level. For example, users that are not authorized to modify communication process flows may not be presented with the option 425 to revert an action to a previous configuration. Alternatively, unauthorized (e.g., unauthenticated) users may be prompted to submit a reason for updating or reverting a specific communication process flow action. After submitting this information, the requested changes and the reason for the requested changes may be presented to an authenticated user. The authenticated user may approve or reject the requested changes by interacting with the user interface 400.

The user interface 400 may support techniques for improved communication process flow management. For example, the techniques and operations described with reference to FIG. 4 may enable a user of a communication process flow management service to efficiently update, revert, or duplicate the configuration of a communication process flow action by associating the configuration with a unique identifier (e.g., the activity identifier 435), which can be used to retrieve the configuration and all related metadata from a storage location. Assigning unique identifiers to action configurations may enable users to apply the same configuration to multiple actions without manually configuring each action. Moreover, the techniques described herein may provide improved cross-platform compatibility between the communication process flow management service and a communication platform by enabling users of the communication platform to update communication process flows from within the communication platform (e.g., via the user interface 400).

Figure 5:
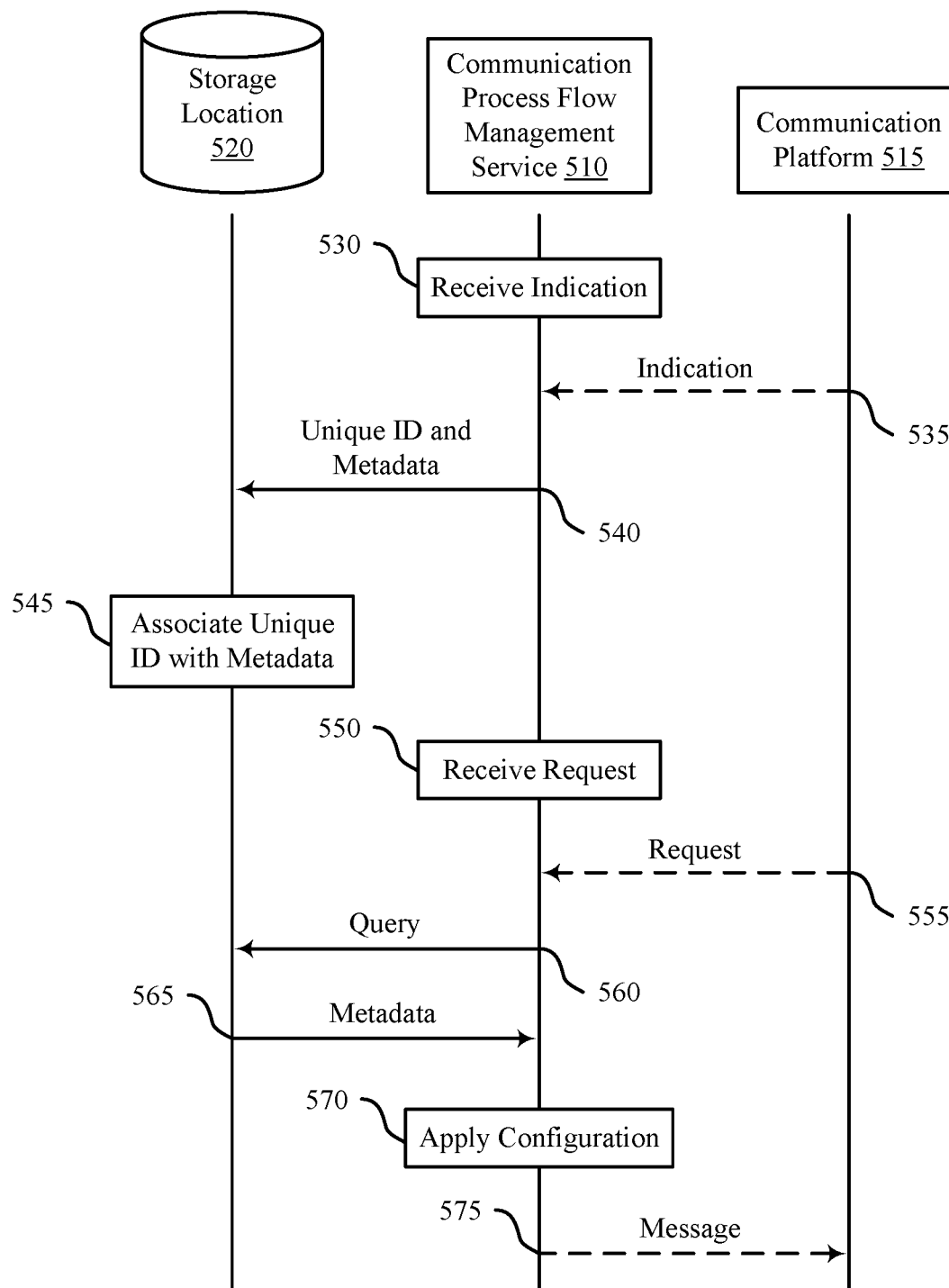
FIG. 5 illustrates an example of a process flow that supports techniques for configuring communication process flow actions in accordance with aspects of the present disclosure.

FIG. 5 illustrates an example of a process flow 500 that supports techniques for configuring communication process flow actions in accordance with aspects of the present disclosure. The process flow 500 may implement or be implemented by aspects of the data processing system 100, the data processing system 200, the user interface 300, or the user interface 400. For example, the process flow 500 may include a communication process flow management service 510, a communication platform 515, and a storage location 520, which may be examples of corresponding devices (e.g., platforms, services, servers, applications) described with reference to FIGS. 1 through 4. In the following description of the process flow 500, operations between the communication process flow management service 510, the communication platform 515, and the storage location 520 may be performed in a different order or at a different time than as shown. Additionally or alternatively, some operations may be omitted or added to the process flow 500. In accordance with the process flow 500, the communication process flow management service 510 may update, revert, or duplicate the configuration of a communication process flow action using a unique identifier associated with the configuration and metadata that defines the configuration.

At 530, the communication process flow management service 510 may receive an indication of a configuration for a first action (e.g., activity) of a first communication process flow that controls electronic communications between a tenant of a multi-tenant system and a first set of users corresponding to the tenant. In some examples, the communication process flow management service 510 may receive the indication from the communication platform 515 (at 535). In other examples, the communication process flow management service 510 may receive the indication from a web application or user interface associated with the communication process flow management service 510. The indication may also specify whether to support queries related to the configuration.

At 540, the communication process flow management service 510 may generate a unique identifier for the configuration, and may transmit an indication of the unique identifier to the storage location 520. The communication process flow management service 510 may also transmit (e.g., to the storage location 520) an indication of metadata that defines the configuration. This metadata may include, for example, an activity name field, a description field, a message name field, a last modified field, an author field, a creation date field, a classification field, a subject field, or a header field, among other examples. At 545, the storage location 520 may associate the unique identifier of the configuration with the metadata defining the configuration. The storage location 520 may include multiple unique identifiers and associated metadata defining configurations for the first action, the first communication process flow, or both.

At 550, the communication process flow management service 510 may receive a request to apply the configuration to a second action of a second communication process flow that controls electronic communications between the tenant and a second set of users corresponding to the tenant. The request may indicate the unique identifier of the configuration, an identifier of the second action, an identifier of the second communication process flow, or a combination thereof. In some examples, the communication process flow management service 510 may receive the request from the communication platform 515 (at 555). In other examples, the communication process flow management service 510 may receive the indication from a web application or user interface associated with the communication process flow management service 510.

At 560, the communication process flow management service 510 may transmit a query to the storage location 520. The query may include the unique identifier of the configuration. Upon receiving the request from the communication process flow management service 510, the storage location 520 may use the unique identifier of the configuration to retrieve the metadata defining the configuration. Accordingly, the storage location 520 may transmit this metadata to the communication process flow management service 510 at 565. After receiving the metadata from the storage location 520, the communication process flow management service 510 may apply the configuration to the second action at 570. For example, the communication process flow management service 510 may perform one or more create operations, undo operations, redo operations, or delete operations on the second action or the second communication process flow. In some examples, the communication process flow management service 510 may apply the configuration to the second action based on a permission of a user associated with the request.

In some examples, the communication process flow management service 510 may receive a second request to revert the configuration of the second action to a previous configuration. The second request may indicate a unique identifier of the previous configuration, an identifier of the second action, an identifier of the second communication process flow, or a combination thereof. The communication process flow management service 510 may determine whether to implement the requested reversion based on a permission of a user associated with the second request. If the communication process flow management service 510 determines that the second request is from an authorized (e.g., authenticated) user, the communication process flow management service 510 may use the unique identifier of the previous configuration to retrieve the corresponding metadata (e.g., metadata defining the previous configuration) from the storage location 520, and may revert the second action to the previous configuration. Alternatively, if the communication process flow management service 510 determines that the second request is from an unauthorized (e.g., unauthorized) user, the communication process flow management service 510 may reject the second request. In such cases, the communication process flow management service 510 may return a request to the communication platform 515 that includes an object indicating that the second request is rejected. The returned request may cause posting of an entry or display of a user interface indicating the rejection.

In some examples, the communication process flow management service 510 may transmit a message to the communication platform 515 at 575. The message may be configured to cause posting of the unique identifier into a communication channel of the communication platform 515, which may enable users of the communication platform 515 to share the unique identifier (and corresponding configuration) with other users. Additionally or alternatively, the message may include a data object (e.g., a JavaScript Object Notation (JSON) object) that is ingestible by the communication platform 515. The data object may include a visualization, an audit log, or other information related to the second action or the second communication process flow. The message may also trigger display of one or more recommended (e.g., suggested) actions for the second communication process flow within the communication channel.

The process flow 500 may support techniques for improved communication process flow management. For example, the techniques and operations described with reference to FIG. 5 may enable a user of the communication process flow management service 510 to efficiently update, revert, or duplicate the configuration of a communication process flow action by associating the configuration with a unique identifier that can be used to retrieve the configuration and related metadata from the storage location 520. Assigning different unique identifiers to different configurations may enable users to apply the same configuration to multiple communication process flow actions without manually configuring each action. Moreover, the techniques described herein may provide improved cross-platform compatibility between the communication process flow management service 510 and the communication platform 515 by enabling users to update communication process flows from within the communication platform 515.

Figure 6:
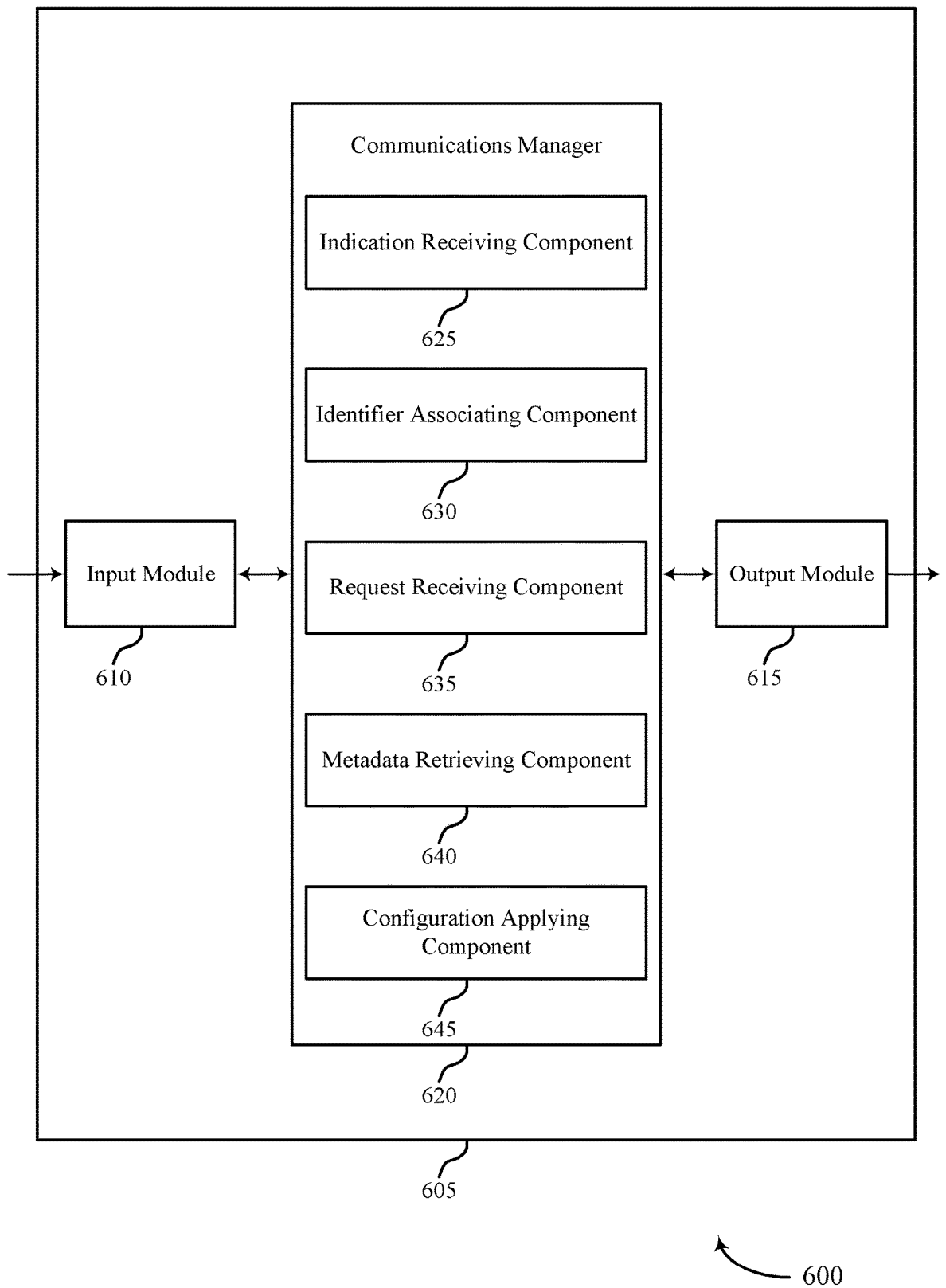
FIG. 6 shows a block diagram of an apparatus that supports techniques for configuring communication process flow actions in accordance with aspects of the present disclosure.

FIG. 6 shows a block diagram 600 of a device 605 that supports techniques for configuring communication process flow actions in accordance with aspects of the present disclosure. The device 605 may include an input module 610, an output module 615, and a communications manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the communications manager 620 to support techniques for configuring communication process flow actions. In some cases, the input module 610 may be a component of an input/output (I/O) controller 810 as described with reference to FIG. 8.

The output module 615 may manage output signals for the device 605. For example, the output module 615 may receive signals from other components of the device 605, such as the communications manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the communications manager 620 may include an indication receiving component 625, an identifier associating component 630, a request receiving component 635, a metadata retrieving component 640, a configuration applying component 645, or any combination thereof. In some examples, the communications manager 620, or various components thereof, may be configured to perform various operations (e.g., receiving, monitoring, transmitting) using or otherwise in cooperation with the input module 610, the output module 615, or both. For example, the communications manager 620 may receive information from the input module 610, send information to the output module 615, or be integrated in combination with the input module 610, the output module 615, or both to receive information, transmit information, or perform various other operations as described herein.

The communications manager 620 may support data processing in accordance with examples as disclosed herein. The indication receiving component 625 may be configured as or otherwise support a means for receiving an indication of a configuration for one or more actions of a communication process flow that controls electronic communications between a tenant of a multi-tenant system and a set of users corresponding to the tenant. The identifier associating component 630 may be configured as or otherwise support a means for associating, within a storage location associated with the tenant, a unique identifier with metadata that defines the configuration. The request receiving component 635 may be configured as or otherwise support a means for receiving a request to apply the configuration to one or more actions of a second communication process flow that controls electronic communications between the tenant and a second set of users corresponding to the tenant, the request indicating the unique identifier associated with the metadata that defines the configuration. The metadata retrieving component 640 may be configured as or otherwise support a means for retrieving, from the storage location and based on the unique identifier indicated by the request, the metadata that defines the configuration. The configuration applying component 645 may be configured as or otherwise support a means for applying the configuration to the one or more actions of the second communication process flow based on retrieving the metadata.

Figure 7:
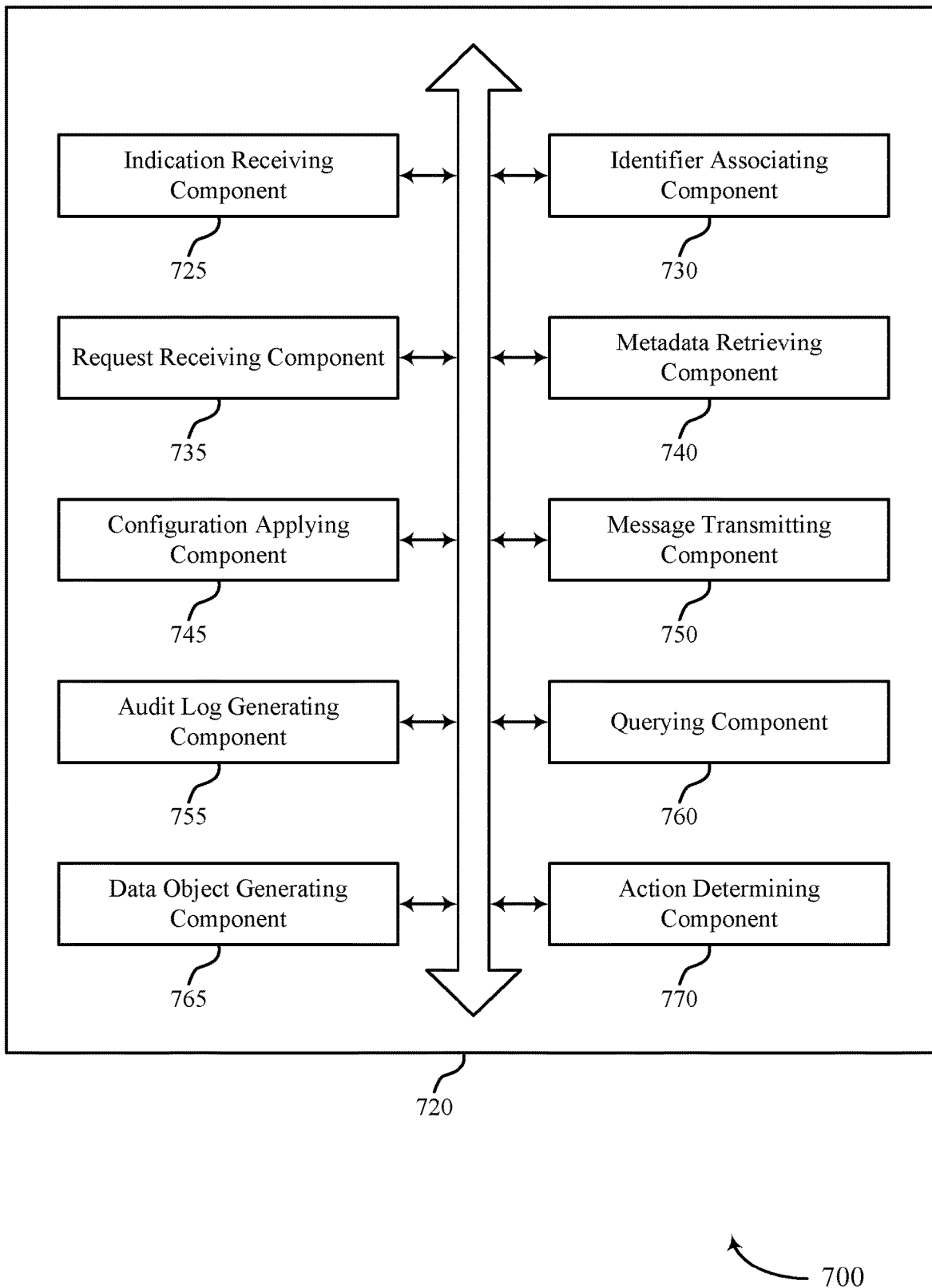
FIG. 7 shows a block diagram of a communications manager that supports techniques for configuring communication process flow actions in accordance with aspects of the present disclosure.

FIG. 7 shows a block diagram 700 of a communications manager 720 that supports techniques for configuring communication process flow actions in accordance with aspects of the present disclosure. The communications manager 720 may be an example of aspects of a communications manager or a communications manager 620, or both, as described herein. The communications manager 720, or various components thereof, may be an example of means for performing various aspects of techniques for configuring communication process flow actions as described herein. For example, the communications manager 720 may include an indication receiving component 725, an identifier associating component 730, a request receiving component 735, a metadata retrieving component 740, a configuration applying component 745, a message transmitting component 750, an audit log generating component 755, a querying component 760, a data object generating component 765, an action determining component 770, or any combination thereof. Each of these components may communicate, directly or indirectly, with one another (e.g., via one or more buses).

The communications manager 720 may support data processing in accordance with examples as disclosed herein. The indication receiving component 725 may be configured as or otherwise support a means for receiving an indication of a configuration for one or more actions of a communication process flow that controls electronic communications between a tenant of a multi-tenant system and a set of users corresponding to the tenant. The identifier associating component 730 may be configured as or otherwise support a means for associating, within a storage location associated with the tenant, a unique identifier with metadata that defines the configuration. The request receiving component 735 may be configured as or otherwise support a means for receiving a request to apply the configuration to one or more actions of a second communication process flow that controls electronic communications between the tenant and a second set of users corresponding to the tenant, the request indicating the unique identifier associated with the metadata that defines the configuration. The metadata retrieving component 740 may be configured as or otherwise support a means for retrieving, from the storage location and based on the unique identifier indicated by the request, the metadata that defines the configuration. The configuration applying component 745 may be configured as or otherwise support a means for applying the configuration to the one or more actions of the second communication process flow based on retrieving the metadata.

In some examples, the indication receiving component 725 may be configured as or otherwise support a means for receiving an indication of whether to support queries related to the configuration for the one or more actions of the communication process flow, where associating the unique identifier with the metadata that defines the configuration is based on receiving the indication.

In some examples, to support applying the configuration, the configuration applying component 745 may be configured as or otherwise support a means for applying the configuration to the one or more actions of the second communication process flow based on a permission corresponding to a user associated with the request.

In some examples, the request receiving component 735 may be configured as or otherwise support a means for receiving a second request to revert the one or more actions of the second communication process flow to a previous configuration, the second request indicating a second unique identifier associated with metadata that defines the previous configuration. In some examples, the configuration applying component 745 may be configured as or otherwise support a means for applying the previous configuration to the one or more actions of the second communication process flow based on the second request.

In some examples, the request receiving component 735 may be configured as or otherwise support a means for receiving, from a user associated with the tenant, a second request to revert the one or more actions of the second communication process flow to a previous configuration. In some examples, the request receiving component 735 may be configured as or otherwise support a means for rejecting the second request based on a permission corresponding to the user.

In some examples, the message transmitting component 750 may be configured as or otherwise support a means for transmitting, to a communication platform that supports communications between users of the multi-tenant system, a message configured to cause posting of the unique identifier into a communication channel of the communication platform.

In some examples, to support receiving the request, the request receiving component 735 may be configured as or otherwise support a means for receiving the request from a communication process flow management service associated with the multi-tenant system or from a communication platform that supports communications between users of the multi-tenant system.

In some examples, to support applying the configuration, the configuration applying component 745 may be configured as or otherwise support a means for applying one or more changes to the second communication process flow, the one or more changes including create operations, undo operations, redo operations, delete operations, or a combination thereof.

In some examples, the data object generating component 765 may be configured as or otherwise support a means for generating a data object that includes an indication of the one or more changes, an option to approve the one or more changes, an option to revert the one or more changes, or a combination thereof. In some examples, the message transmitting component 750 may be configured as or otherwise support a means for transmitting, to a communication platform that supports communications between users of the multi-tenant system, a message configured to cause posting of the data object into a communication channel of the communication platform.

In some examples, the audit log generating component 755 may be configured as or otherwise support a means for generating an audit log associated with the second communication process flow based on applying the configuration, the audit log indicating a number of previous changes to the second communication process flow. In some examples, the message transmitting component 750 may be configured as or otherwise support a means for transmitting, to a communication platform that supports communications between users of the multi-tenant system, a message configured to cause posting of the audit log into a communication channel of the communication platform.

In some examples, the action determining component 770 may be configured as or otherwise support a means for determining a set of recommended actions for the second communication process flow based on the audit log associated with the second communication process flow. In some examples, the message transmitting component 750 may be configured as or otherwise support a means for transmitting, to the communication platform, a second message configured to cause posting of the set of recommended actions into the communication channel of the communication platform.

In some examples, the storage location associated with the tenant includes multiple unique identifiers associated with metadata that defines multiple configurations for the communication process flow, multiple configurations for the second communication process flow, or both. In some examples, the metadata includes an activity name field, a description field, a message name field, a last modified date field, an author field, a creation date field, a classification field, a subject field, a header field, or a combination thereof.

In some examples, the querying component 760 may be configured as or otherwise support a means for querying, based on receiving the request, the storage location for the metadata that defines the configuration, where retrieving the metadata from the storage location is based on the querying.

Figure 8:
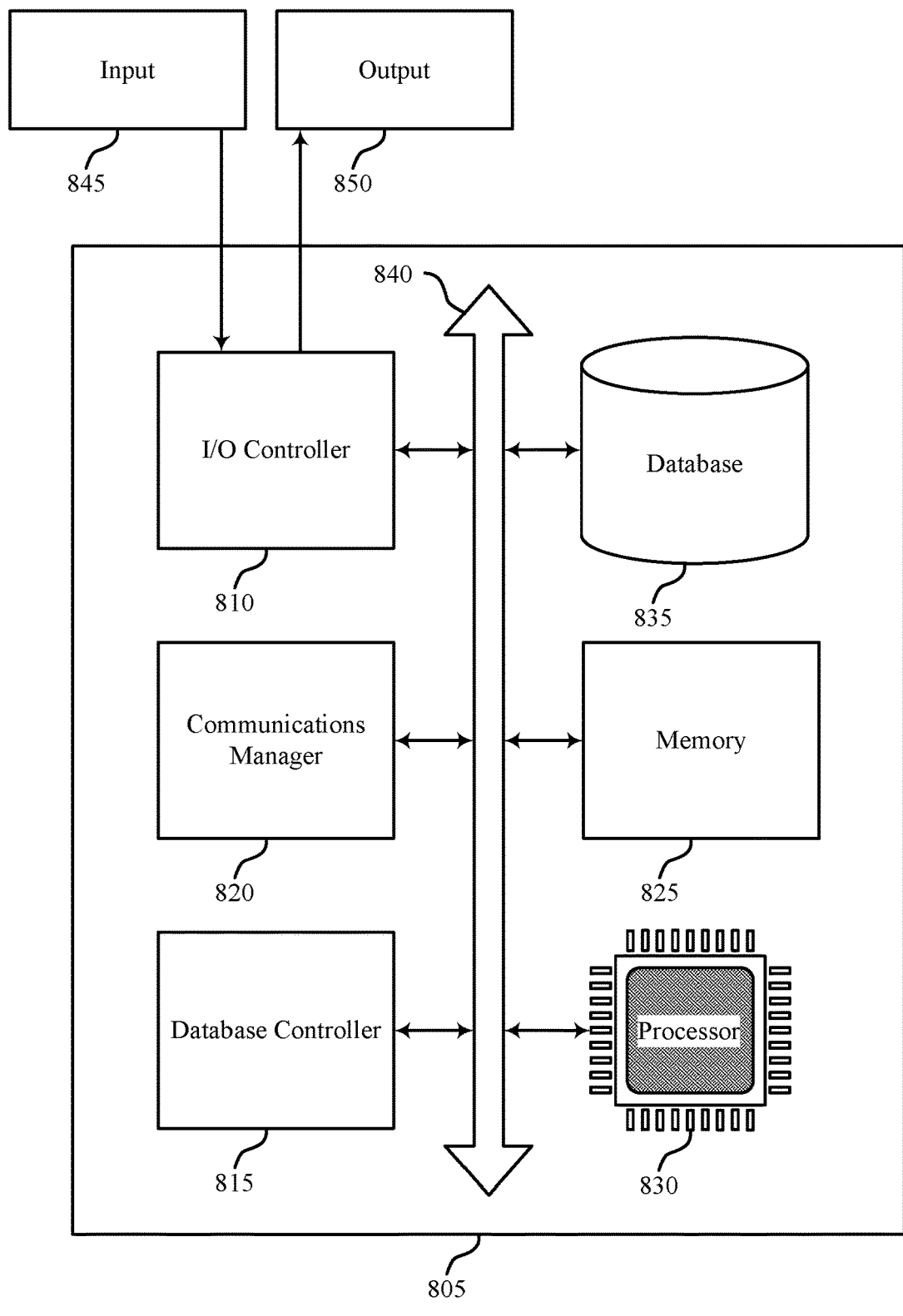
FIG. 8 shows a diagram of a system including a device that supports techniques for configuring communication process flow actions in accordance with aspects of the present disclosure.

FIG. 8 shows a diagram of a system 800 including a device 805 that supports techniques for configuring communication process flow actions in accordance with aspects of the present disclosure. The device 805 may be an example of or include the components of a device 605 as described herein. The device 805 may include components for bi-directional data communications including components for transmitting and receiving communications, such as a communications manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a basic I/O system (BIOS) which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for configuring communication process flow actions).

The communications manager 820 may support data processing in accordance with examples as disclosed herein. For example, the communications manager 820 may be configured as or otherwise support a means for receiving an indication of a configuration for one or more actions of a communication process flow that controls electronic communications between a tenant of a multi-tenant system and a set of users corresponding to the tenant. The communications manager 820 may be configured as or otherwise support a means for associating, within a storage location associated with the tenant, a unique identifier with metadata that defines the configuration. The communications manager 820 may be configured as or otherwise support a means for receiving a request to apply the configuration to one or more actions of a second communication process flow that controls electronic communications between the tenant and a second set of users corresponding to the tenant, the request indicating the unique identifier associated with the metadata that defines the configuration. The communications manager 820 may be configured as or otherwise support a means for retrieving, from the storage location and based on the unique identifier indicated by the request, the metadata that defines the configuration. The communications manager 820 may be configured as or otherwise support a means for applying the configuration to the one or more actions of the second communication process flow based on retrieving the metadata.

By including or configuring the communications manager 820 in accordance with examples as described herein, the device 805 may support techniques for improved communication process flow management. For example, the techniques and operations described herein may enable a user of a communication process flow management service to efficiently update, revert, or duplicate a configuration of a communication process flow action by associating the configuration with a unique identifier that can be used to retrieve the configuration and all related metadata from a storage location. Assigning different unique identifiers to different configurations may enable users to apply the same configuration to multiple communication process flow actions without manually configuring each action. Moreover, the techniques described herein may provide improved cross-platform compatibility between the communication process flow management service and a communication platform by enabling users to update communication process flows from within the communication platform.

Figure 9:
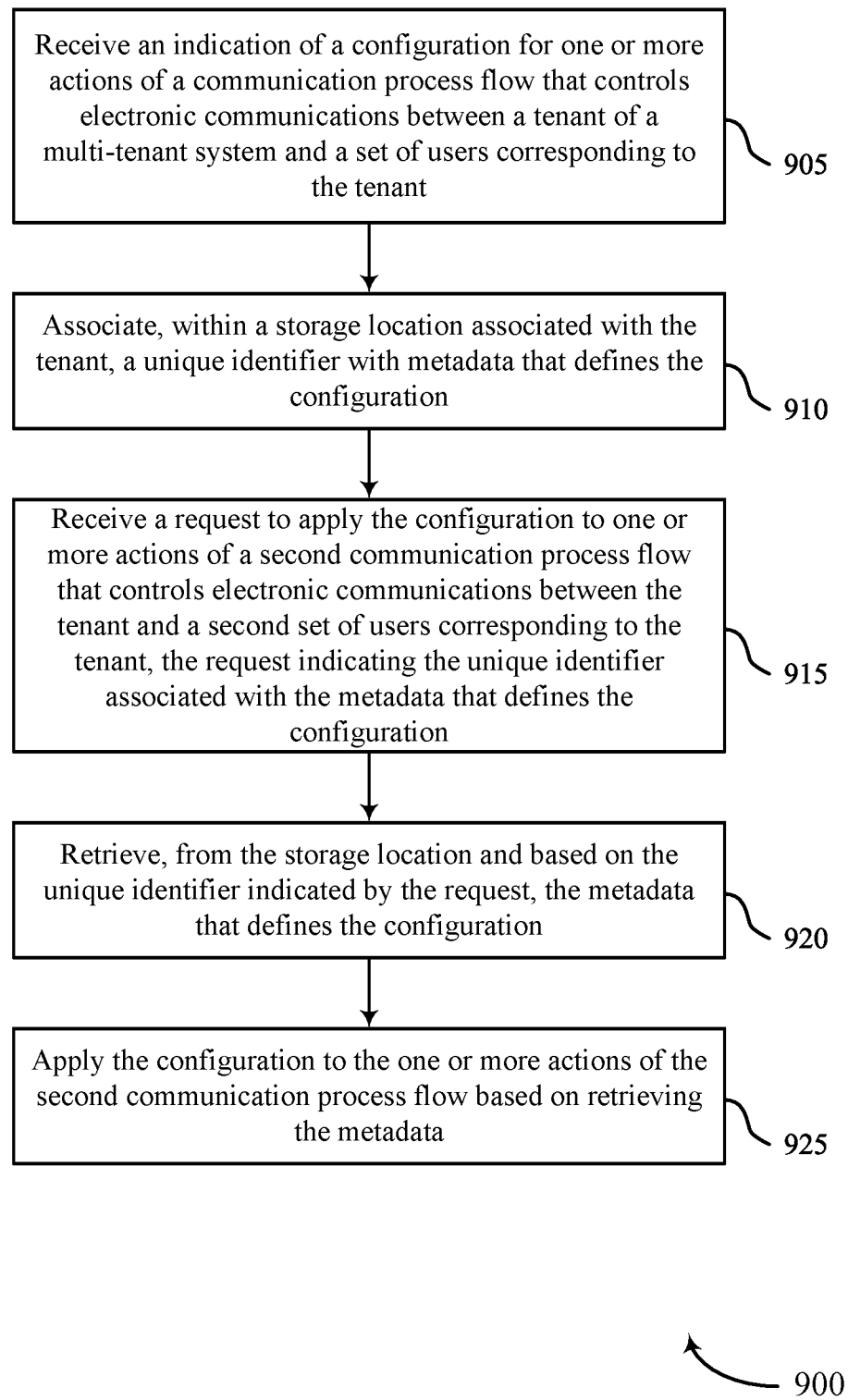
FIGS. 9 through 12 show flowcharts illustrating methods that support techniques for configuring communication process flow actions in accordance with aspects of the present disclosure.

FIG. 9 shows a flowchart illustrating a method 900 that supports techniques for configuring communication process flow actions in accordance with aspects of the present disclosure. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 905, the method may include receiving an indication of a configuration for one or more actions of a communication process flow that controls electronic communications between a tenant of a multi-tenant system and a set of users corresponding to the tenant. The operations of 905 may be performed in accordance with examples as disclosed herein. In some examples, aspects of the operations of 905 may be performed by an indication receiving component 725 as described with reference to FIG. 7.

At 910, the method may include associating, within a storage location associated with the tenant, a unique identifier with metadata that defines the configuration. The operations of 910 may be performed in accordance with examples as disclosed herein. In some examples, aspects of the operations of 910 may be performed by an identifier associating component 730 as described with reference to FIG. 7.

At 915, the method may include receiving a request to apply the configuration to one or more actions of a second communication process flow that controls electronic communications between the tenant and a second set of users corresponding to the tenant, the request indicating the unique identifier associated with the metadata that defines the configuration. The operations of 915 may be performed in accordance with examples as disclosed herein. In some examples, aspects of the operations of 915 may be performed by a request receiving component 735 as described with reference to FIG. 7.

At 920, the method may include retrieving, from the storage location and based on the unique identifier indicated by the request, the metadata that defines the configuration. The operations of 920 may be performed in accordance with examples as disclosed herein. In some examples, aspects of the operations of 920 may be performed by a metadata retrieving component 740 as described with reference to FIG. 7.

At 925, the method may include applying the configuration to the one or more actions of the second communication process flow based on retrieving the metadata. The operations of 925 may be performed in accordance with examples as disclosed herein. In some examples, aspects of the operations of 925 may be performed by a configuration applying component 745 as described with reference to FIG. 7.

Figure 10:
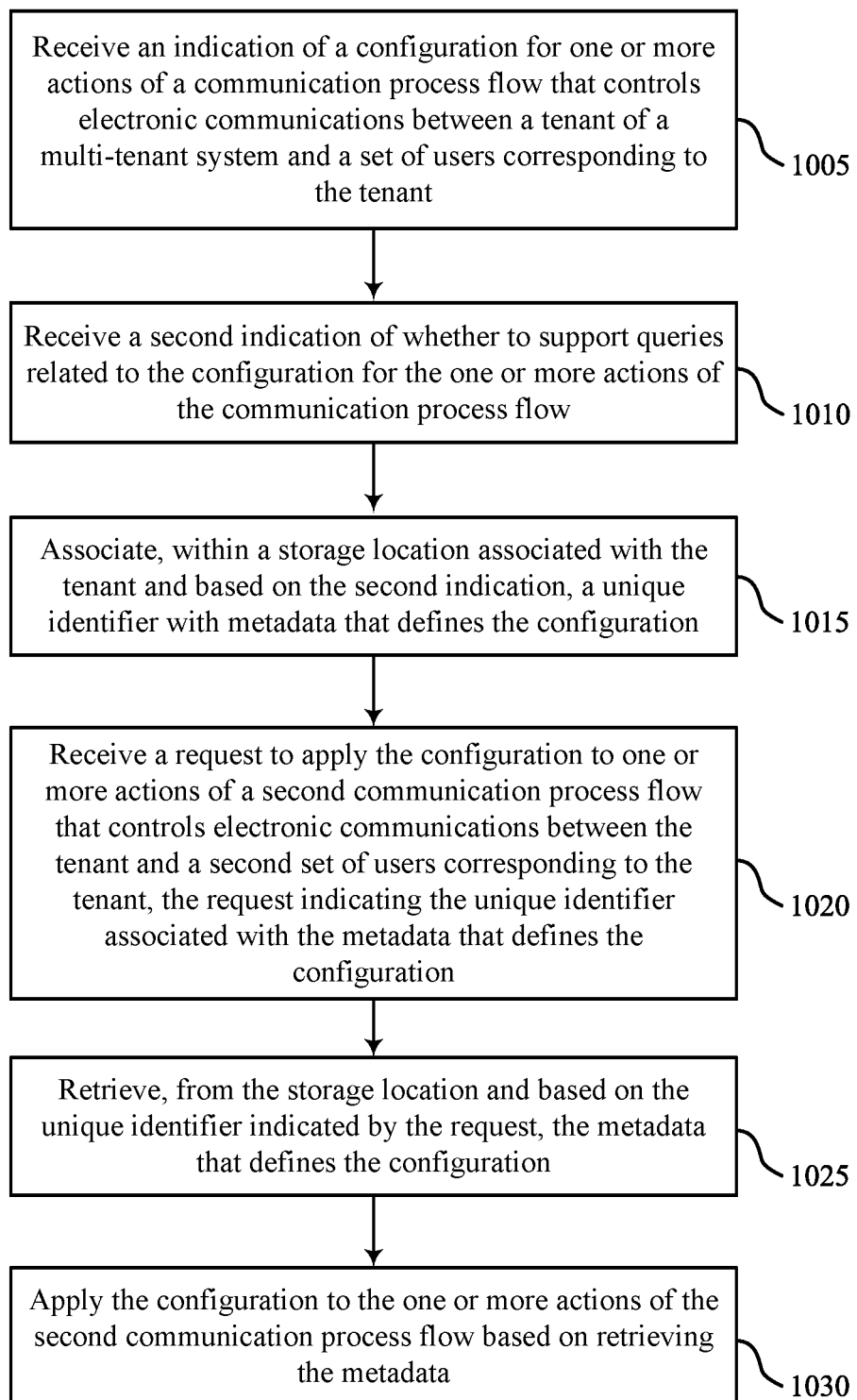

FIG. 10 shows a flowchart illustrating a method 1000 that supports techniques for configuring communication process flow actions in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1005, the method may include receiving an indication of a configuration for one or more actions of a communication process flow that controls electronic communications between a tenant of a multi-tenant system and a set of users corresponding to the tenant. The operations of 1005 may be performed in accordance with examples as disclosed herein. In some examples, aspects of the operations of 1005 may be performed by an indication receiving component 725 as described with reference to FIG. 7.

At 1010, the method may include receiving a second indication of whether to support queries related to the configuration for the one or more actions of the communication process flow. The operations of 1010 may be performed in accordance with examples as disclosed herein. In some examples, aspects of the operations of 1010 may be performed by an indication receiving component 725 as described with reference to FIG. 7.

At 1015, the method may include associating, within a storage location associated with the tenant and based on the second indication, a unique identifier with metadata that defines the configuration. The operations of 1015 may be performed in accordance with examples as disclosed herein. In some examples, aspects of the operations of 1015 may be performed by an identifier associating component 730 as described with reference to FIG. 7.

At 1020, the method may include receiving a request to apply the configuration to one or more actions of a second communication process flow that controls electronic communications between the tenant and a second set of users corresponding to the tenant, the request indicating the unique identifier associated with the metadata that defines the configuration. The operations of 1020 may be performed in accordance with examples as disclosed herein. In some examples, aspects of the operations of 1020 may be performed by a request receiving component 735 as described with reference to FIG. 7.

At 1025, the method may include retrieving, from the storage location and based on the unique identifier indicated by the request, the metadata that defines the configuration. The operations of 1025 may be performed in accordance with examples as disclosed herein. In some examples, aspects of the operations of 1025 may be performed by a metadata retrieving component 740 as described with reference to FIG. 7.

At 1030, the method may include applying the configuration to the one or more actions of the second communication process flow based on retrieving the metadata. The operations of 1030 may be performed in accordance with examples as disclosed herein. In some examples, aspects of the operations of 1030 may be performed by a configuration applying component 745 as described with reference to FIG. 7.

Figure 11:
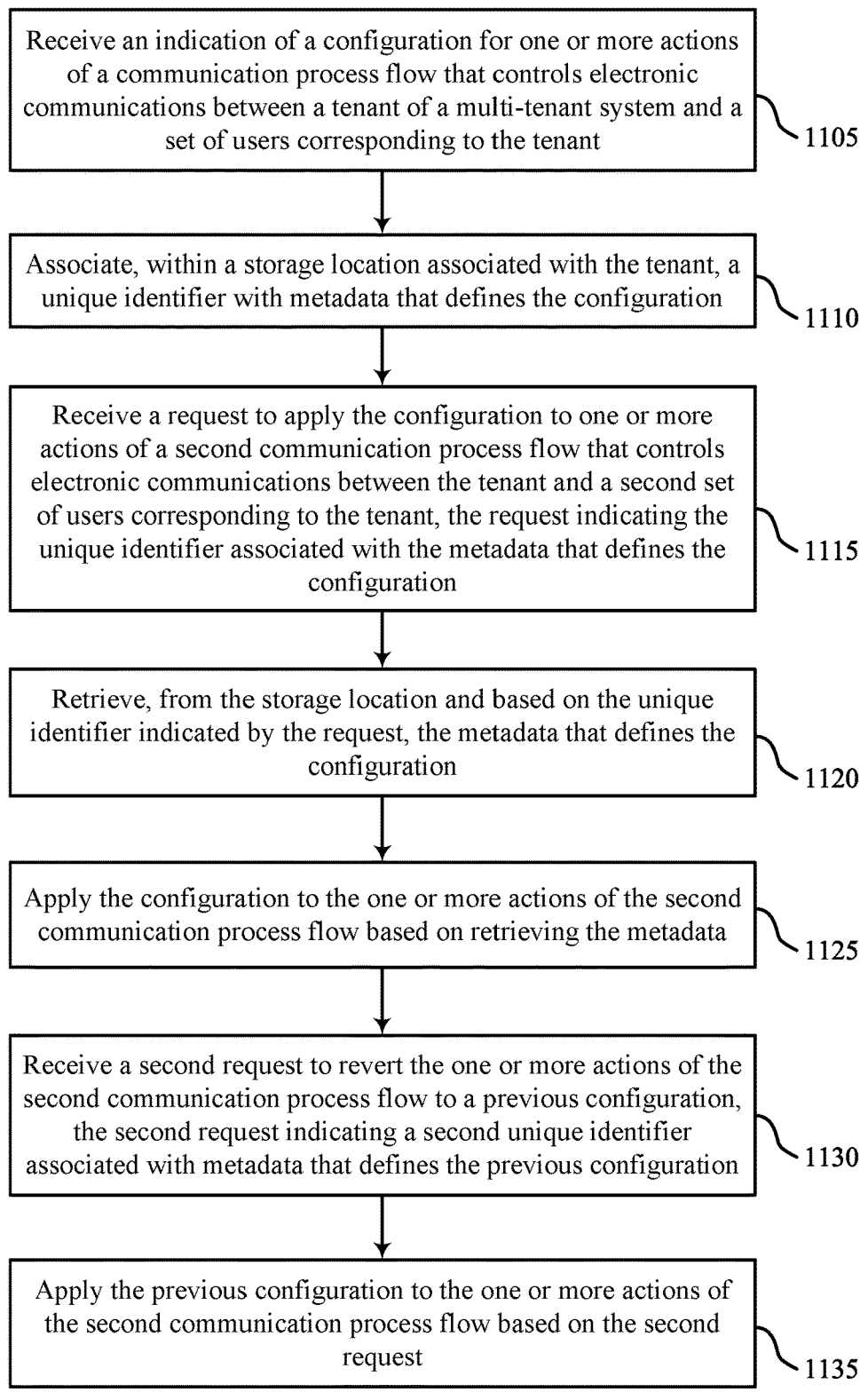

FIG. 11 shows a flowchart illustrating a method 1100 that supports techniques for configuring communication process flow actions in accordance with aspects of the present disclosure. The operations of the method 1100 may be implemented by an application server or its components as described herein. For example, the operations of the method 1100 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1105, the method may include receiving an indication of a configuration for one or more actions of a communication process flow that controls electronic communications between a tenant of a multi-tenant system and a set of users corresponding to the tenant. The operations of 1105 may be performed in accordance with examples as disclosed herein. In some examples, aspects of the operations of 1105 may be performed by an indication receiving component 725 as described with reference to FIG. 7.

At 1110, the method may include associating, within a storage location associated with the tenant, a unique identifier with metadata that defines the configuration. The operations of 1110 may be performed in accordance with examples as disclosed herein. In some examples, aspects of the operations of 1110 may be performed by an identifier associating component 730 as described with reference to FIG. 7.

At 1115, the method may include receiving a request to apply the configuration to one or more actions of a second communication process flow that controls electronic communications between the tenant and a second set of users corresponding to the tenant, the request indicating the unique identifier associated with the metadata that defines the configuration. The operations of 1115 may be performed in accordance with examples as disclosed herein. In some examples, aspects of the operations of 1115 may be performed by a request receiving component 735 as described with reference to FIG. 7.

At 1120, the method may include retrieving, from the storage location and based on the unique identifier indicated by the request, the metadata that defines the configuration. The operations of 1120 may be performed in accordance with examples as disclosed herein. In some examples, aspects of the operations of 1120 may be performed by a metadata retrieving component 740 as described with reference to FIG. 7.

At 1125, the method may include applying the configuration to the one or more actions of the second communication process flow based on retrieving the metadata. The operations of 1125 may be performed in accordance with examples as disclosed herein. In some examples, aspects of the operations of 1125 may be performed by a configuration applying component 745 as described with reference to FIG. 7.

At 1130, the method may include receiving a second request to revert the one or more actions of the second communication process flow to a previous configuration, the second request indicating a second unique identifier associated with metadata that defines the previous configuration. The operations of 1130 may be performed in accordance with examples as disclosed herein. In some examples, aspects of the operations of 1130 may be performed by a request receiving component 735 as described with reference to FIG. 7.

At 1135, the method may include applying the previous configuration to the one or more actions of the second communication process flow based on the second request. The operations of 1135 may be performed in accordance with examples as disclosed herein. In some examples, aspects of the operations of 1135 may be performed by a configuration applying component 745 as described with reference to FIG. 7.

Figure 12:
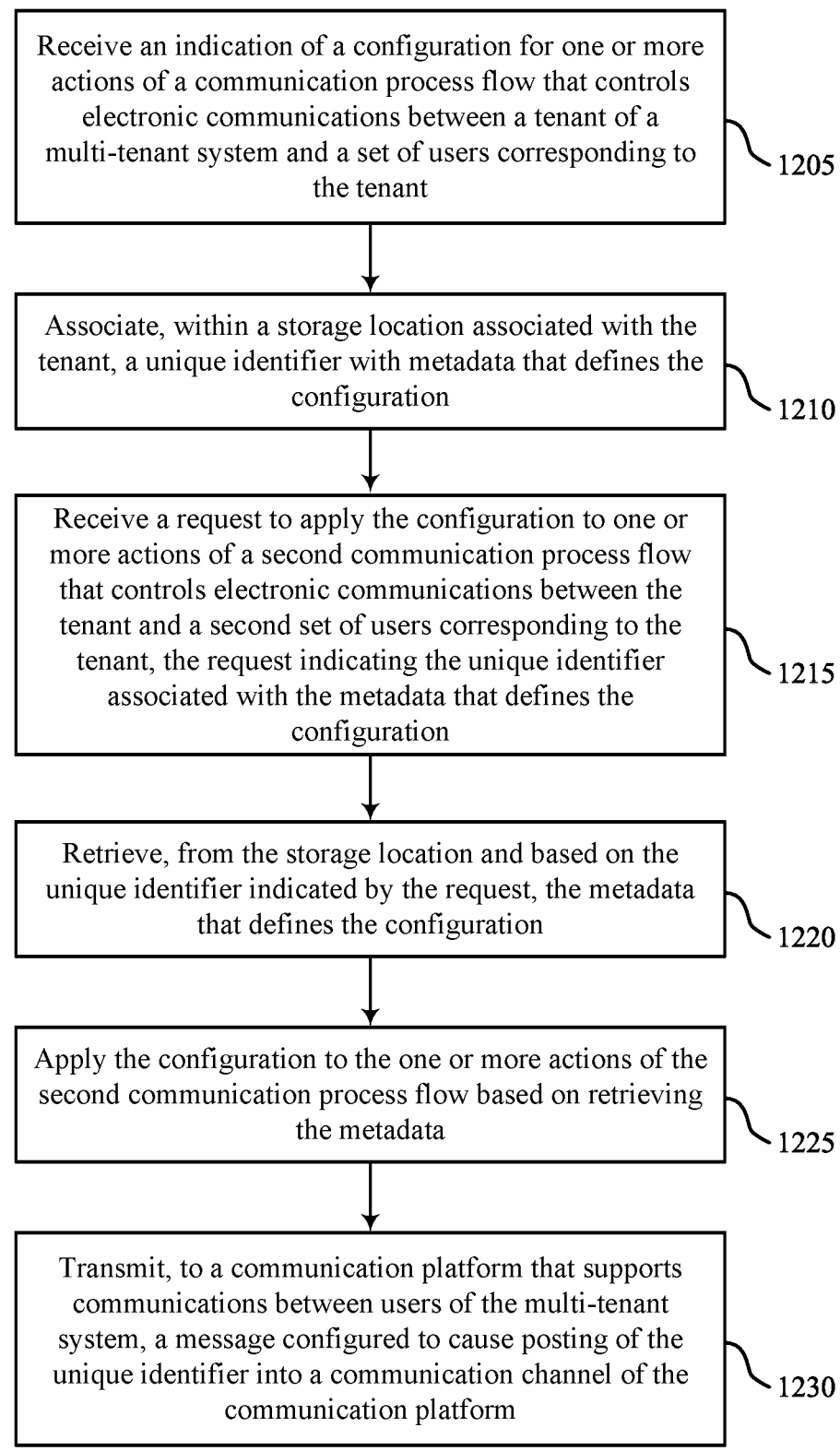

FIG. 12 shows a flowchart illustrating a method 1200 that supports techniques for configuring communication process flow actions in accordance with aspects of the present disclosure. The operations of the method 1200 may be implemented by an application server or its components as described herein. For example, the operations of the method 1200 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1205, the method may include receiving an indication of a configuration for one or more actions of a communication process flow that controls electronic communications between a tenant of a multi-tenant system and a set of users corresponding to the tenant. The operations of 1205 may be performed in accordance with examples as disclosed herein. In some examples, aspects of the operations of 1205 may be performed by an indication receiving component 725 as described with reference to FIG. 7.

At 1210, the method may include associating, within a storage location associated with the tenant, a unique identifier with metadata that defines the configuration. The operations of 1210 may be performed in accordance with examples as disclosed herein. In some examples, aspects of the operations of 1210 may be performed by an identifier associating component 730 as described with reference to FIG. 7.

At 1215, the method may include receiving a request to apply the configuration to one or more actions of a second communication process flow that controls electronic communications between the tenant and a second set of users corresponding to the tenant, the request indicating the unique identifier associated with the metadata that defines the configuration. The operations of 1215 may be performed in accordance with examples as disclosed herein. In some examples, aspects of the operations of 1215 may be performed by a request receiving component 735 as described with reference to FIG. 7.

At 1220, the method may include retrieving, from the storage location and based on the unique identifier indicated by the request, the metadata that defines the configuration. The operations of 1220 may be performed in accordance with examples as disclosed herein. In some examples, aspects of the operations of 1220 may be performed by a metadata retrieving component 740 as described with reference to FIG. 7.

At 1225, the method may include applying the configuration to the one or more actions of the second communication process flow based on retrieving the metadata. The operations of 1225 may be performed in accordance with examples as disclosed herein. In some examples, aspects of the operations of 1225 may be performed by a configuration applying component 745 as described with reference to FIG. 7.

At 1230, the method may include transmitting, to a communication platform that supports communications between users of the multi-tenant system, a message configured to cause posting of the unique identifier into a communication channel of the communication platform. The operations of 1230 may be performed in accordance with examples as disclosed herein. In some examples, aspects of the operations of 1230 may be performed by a message transmitting component 750 as described with reference to FIG. 7.

A method for data processing is described. The method may include receiving an indication of a configuration for one or more actions of a communication process flow that controls electronic communications between a tenant of a multi-tenant system and a set of users corresponding to the tenant; associating, within a storage location associated with the tenant, a unique identifier with metadata that defines the configuration; receiving a request to apply the configuration to one or more actions of a second communication process flow that controls electronic communications between the tenant and a second set of users corresponding to the tenant, the request indicating the unique identifier associated with the metadata that defines the configuration; retrieving, from the storage location and based on the unique identifier indicated by the request, the metadata that defines the configuration; and applying the configuration to the one or more actions of the second communication process flow based on retrieving the metadata.

An apparatus for data processing is described. The apparatus may include a processor, memory coupled with the processor, and instructions stored in the memory. The instructions may be executable by the processor to cause the apparatus to receive an indication of a configuration for one or more actions of a communication process flow that controls electronic communications between a tenant of a multi-tenant system and a set of users corresponding to the tenant; associate, within a storage location associated with the tenant, a unique identifier with metadata that defines the configuration; receive a request to apply the configuration to one or more actions of a second communication process flow that controls electronic communications between the tenant and a second set of users corresponding to the tenant, the request indicating the unique identifier associated with the metadata that defines the configuration; retrieve, from the storage location and based on the unique identifier indicated by the request, the metadata that defines the configuration; and apply the configuration to the one or more actions of the second communication process flow based on retrieving the metadata.

Another apparatus for data processing is described. The apparatus may include means for receiving an indication of a configuration for one or more actions of a communication process flow that controls electronic communications between a tenant of a multi-tenant system and a set of users corresponding to the tenant; means for associating, within a storage location associated with the tenant, a unique identifier with metadata that defines the configuration; means for receiving a request to apply the configuration to one or more actions of a second communication process flow that controls electronic communications between the tenant and a second set of users corresponding to the tenant, the request indicating the unique identifier associated with the metadata that defines the configuration; means for retrieving, from the storage location and based on the unique identifier indicated by the request, the metadata that defines the configuration; and means for applying the configuration to the one or more actions of the second communication process flow based on retrieving the metadata.

A non-transitory computer-readable medium storing code for data processing is described. The code may include instructions executable by a processor to receive an indication of a configuration for one or more actions of a communication process flow that controls electronic communications between a tenant of a multi-tenant system and a set of users corresponding to the tenant; associate, within a storage location associated with the tenant, a unique identifier with metadata that defines the configuration; receive a request to apply the configuration to one or more actions of a second communication process flow that controls electronic communications between the tenant and a second set of users corresponding to the tenant, the request indicating the unique identifier associated with the metadata that defines the configuration; retrieve, from the storage location and based on the unique identifier indicated by the request, the metadata that defines the configuration; and apply the configuration to the one or more actions of the second communication process flow based on retrieving the metadata.

Some examples of the method, apparatuses, and non-transitory computer-readable medium described herein may further include operations, features, means, or instructions for receiving an indication of whether to support queries related to the configuration for the one or more actions of the communication process flow, where associating the unique identifier with the metadata that defines the configuration may be based on receiving the indication.

In some examples of the method, apparatuses, and non-transitory computer-readable medium described herein, applying the configuration may include operations, features, means, or instructions for applying the configuration to the one or more actions of the second communication process flow based on a permission corresponding to a user associated with the request.

Some examples of the method, apparatuses, and non-transitory computer-readable medium described herein may further include operations, features, means, or instructions for receiving a second request to revert the one or more actions of the second communication process flow to a previous configuration, the second request indicating a second unique identifier associated with metadata that defines the previous configuration; and applying the previous configuration to the one or more actions of the second communication process flow based on the second request.

Some examples of the method, apparatuses, and non-transitory computer-readable medium described herein may further include operations, features, means, or instructions for receiving, from a user associated with the tenant, a second request to revert the one or more actions of the second communication process flow to a previous configuration; and rejecting the second request based on a permission corresponding to the user.

Some examples of the method, apparatuses, and non-transitory computer-readable medium described herein may further include operations, features, means, or instructions for transmitting, to a communication platform that supports communications between users of the multi-tenant system, a message configured to cause posting of the unique identifier into a communication channel of the communication platform.

In some examples of the method, apparatuses, and non-transitory computer-readable medium described herein, receiving the request may include operations, features, means, or instructions for receiving the request from a communication process flow management service associated with the multi-tenant system or from a communication platform that supports communications between users of the multi-tenant system.

In some examples of the method, apparatuses, and non-transitory computer-readable medium described herein, applying the configuration may include operations, features, means, or instructions for applying one or more changes to the second communication process flow, the one or more changes including create operations, undo operations, redo operations, delete operations, or a combination thereof.

Some examples of the method, apparatuses, and non-transitory computer-readable medium described herein may further include operations, features, means, or instructions for generating a data object that includes an indication of the one or more changes, an option to approve the one or more changes, an option to revert the one or more changes, or a combination thereof and transmitting, to a communication platform that supports communications between users of the multi-tenant system, a message configured to cause posting of the data object into a communication channel of the communication platform.

Some examples of the method, apparatuses, and non-transitory computer-readable medium described herein may further include operations, features, means, or instructions for generating an audit log associated with the second communication process flow based on applying the configuration, the audit log indicating a number of previous changes to the second communication process flow; and transmitting, to a communication platform that supports communications between users of the multi-tenant system, a message configured to cause posting of the audit log into a communication channel of the communication platform.

Some examples of the method, apparatuses, and non-transitory computer-readable medium described herein may further include operations, features, means, or instructions for determining a set of recommended actions for the second communication process flow based on the audit log associated with the second communication process flow; and transmitting, to the communication platform, a second message configured to cause posting of the set of recommended actions into the communication channel of the communication platform.

In some examples of the method, apparatuses, and non-transitory computer-readable medium described herein, the storage location associated with the tenant includes multiple unique identifiers associated with metadata that defines multiple configurations for the communication process flow, multiple configurations for the second communication process flow, or both.

Some examples of the method, apparatuses, and non-transitory computer-readable medium described herein may further include operations, features, means, or instructions for querying, based on receiving the request, the storage location for the metadata that defines the configuration, where retrieving the metadata from the storage location may be based on the querying.

In some examples of the method, apparatuses, and non-transitory computer-readable medium described herein, the metadata includes an activity name field, a description field, a message name field, a last modified date field, an author field, a creation date field, a classification field, a subject field, a header field, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
providing an indication of a configuration for one or more actions of a first communication process flow that controls electronic communications between a tenant of a multi-tenant system and a first set of users corresponding to the tenant;
associating metadata that defines the configuration for the one or more actions of the first communication process flow with a unique identifier that is used to retrieve the configuration from a storage location accessible to the tenant;
receiving a request to apply the configuration of the one or more actions in the first communication process flow to one or more actions of a second communication process flow that is different from the first communication process flow and controls electronic communications between the tenant and a second set of users corresponding to the tenant, the request indicating the unique identifier associated with the metadata that defines the configuration;
retrieving, from the storage location and based at least in part on the unique identifier indicated by the request, the metadata that defines the configuration; and
applying the configuration to the one or more actions of the second communication process flow using the metadata retrieved from the storage location.

2. The method of claim 1, wherein the one or more actions of the second communication process flow comprise sending an email to the second set of users corresponding to the tenant.

3. The method of claim 2, wherein the metadata defines content included in the email.

4. The method of claim 1, further comprising:
creating the second communication process flow that controls electronic communications between the tenant and the second set of users corresponding to the tenant.

5. The method of claim 1, wherein the one or more actions of the second communication process flow are associated with respective classifications.

6. The method of claim 1, further comprising:
adding the one or more actions to the second communication process flow that controls electronic communications between the tenant and the second set of users corresponding to the tenant.

7. The method of claim 1, wherein applying the configuration to the one or more actions of the second communication process flow comprises:
configuring one or more parameters associated with the one or more actions of the second communication process flow that controls electronic communications between the tenant and the second set of users corresponding to the tenant.

8. The method of claim 1, wherein the unique identifier comprises an alphanumeric activity identifier associated with the configuration of the one or more actions in the first communication process flow.

9. An apparatus for data processing, comprising:
one or more processors;
one or more memories coupled with the one or more processors; and
instructions stored in the one or more memories and executable by the one or more processors to cause the apparatus to:
provide an indication of a configuration for one or more actions of a first communication process flow that controls electronic communications between a tenant of a multi-tenant system and a first set of users corresponding to the tenant;
associate metadata that defines the configuration for the one or more actions of the first communication process flow with a unique identifier that is used to retrieve the configuration from a storage location accessible to the tenant;
receive a request to apply the configuration of the one or more actions in the first communication process flow to one or more actions of a second communication process flow that is different from the first communication process flow and controls electronic communications between the tenant and a second set of users corresponding to the tenant, the request indicating the unique identifier associated with the metadata that defines the configuration;
retrieve, from the storage location and based at least in part on the unique identifier indicated by the request, the metadata that defines the configuration; and
apply the configuration to the one or more actions of the second communication process flow using the metadata retrieved from the storage location.

10. The apparatus of claim 9, wherein the one or more actions of the second communication process flow comprise sending an email to the second set of users corresponding to the tenant.

11. The apparatus of claim 10, wherein the metadata defines content included in the email.

12. The apparatus of claim 9, wherein the instructions are further executable by the one or more processors to cause the apparatus to:
create the second communication process flow that controls electronic communications between the tenant and the second set of users corresponding to the tenant.

13. The apparatus of claim 9, wherein:
the one or more actions of the second communication process flow are associated with respective classifications.

14. The apparatus of claim 9, wherein the instructions are further executable by the one or more processors to cause the apparatus to:
add the one or more actions to the second communication process flow that controls electronic communications between the tenant and the second set of users corresponding to the tenant.

15. The apparatus of claim 9, wherein the instructions to apply the configuration to the one or more actions of the second communication process flow are executable by the one or more processors to cause the apparatus to:
configure one or more parameters associated with the one or more actions of the second communication process flow that controls electronic communications between the tenant and the second set of users corresponding to the tenant.

16. The apparatus of claim 9, wherein the unique identifier comprises an alphanumeric activity identifier associated with the configuration of the one or more actions in the first communication process flow.

17. A non-transitory computer-readable medium storing code for data processing, the code comprising instructions executable by one or more processors to:
provide an indication of a configuration for one or more actions of a first communication process flow that controls electronic communications between a tenant of a multi-tenant system and a first set of users corresponding to the tenant;
associate metadata that defines the configuration for the one or more actions of the first communication process flow with a unique identifier that is used to retrieve the configuration from a storage location accessible to the tenant;
receive a request to apply the configuration of the one or more actions in the first communication process flow to one or more actions of a second communication process flow that is different from the first communication process flow and controls electronic communications between the tenant and a second set of users corresponding to the tenant, the request indicating the unique identifier associated with the metadata that defines the configuration;
retrieve, from the storage location and based at least in part on the unique identifier indicated by the request, the metadata that defines the configuration; and
apply the configuration to the one or more actions of the second communication process flow using the metadata retrieved from the storage location.

18. The non-transitory computer-readable medium of claim 17, wherein the one or more actions of the second communication process flow comprise sending an email to the second set of users corresponding to the tenant.

19. The non-transitory computer-readable medium of claim 18, wherein the metadata defines content included in the email.

20. The non-transitory computer-readable medium of claim 17, wherein the instructions are further executable by the one or more processors to:
create the second communication process flow that controls electronic communications between the tenant and the second set of users corresponding to the tenant.

* * * * *